Oct. 22, 1929.  H. M. COOK ET AL  1,733,006
METHOD OF COATING PIPES
Filed July 17, 1929   2 Sheets-Sheet 1
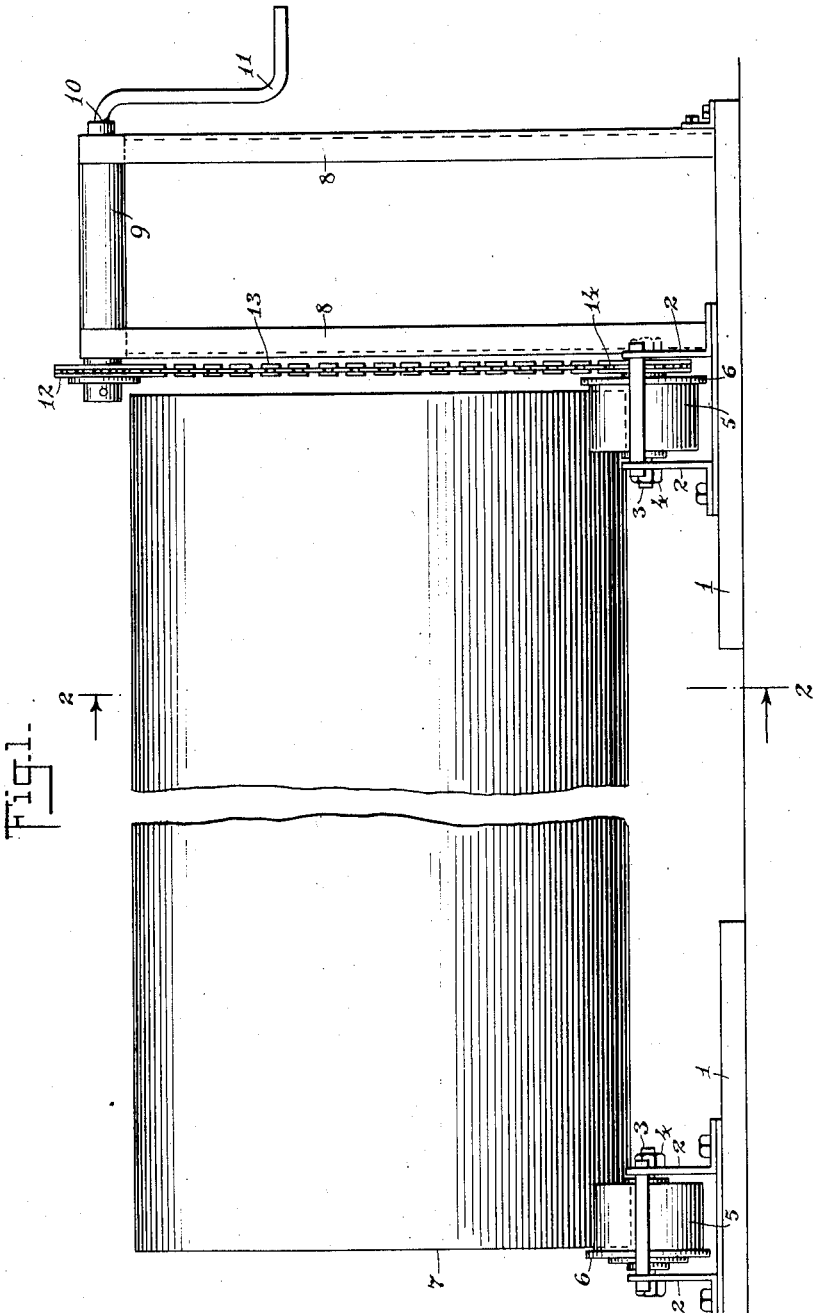
WITNESSES
INVENTORS
Hugh M. Cook
BY Lorlys R. Rogers
ATTORNEYS

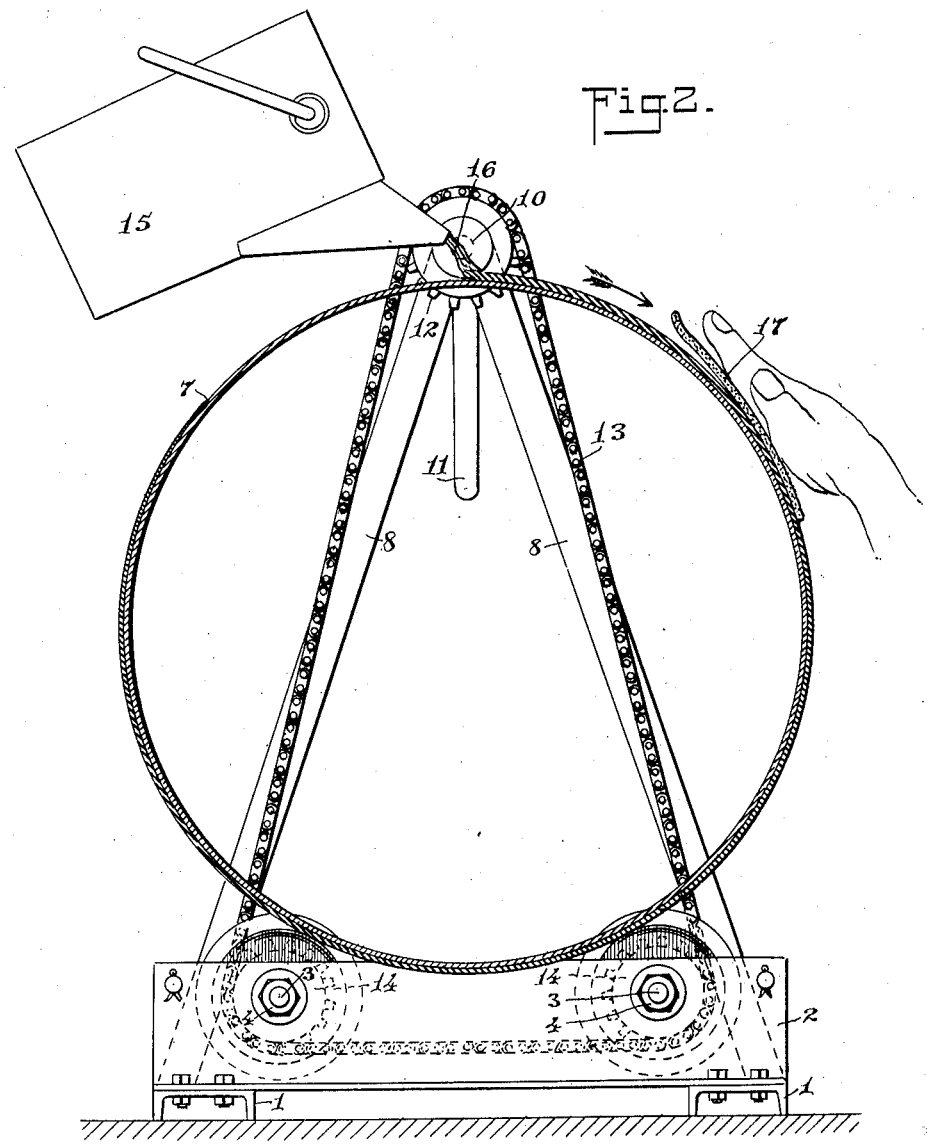

Patented Oct. 22, 1929

1,733,006

UNITED STATES PATENT OFFICE

HUGH M. COOK, OF NEW YORK, N. Y., AND LORLYS R. ROGERS, OF COTTAGE HILL, FLORIDA, ASSIGNORS TO WAILES DOVE-HERMISTON CORPORATION, OF NEW YORK, N. Y., A CORPORATION OF NEW YORK

METHOD OF COATING PIPES

Application filed July 17, 1929. Serial No. 379,003.

This invention relates to an improved method of coating pipe and has particularly to do with the coating of large pipe such as employed in underground mains.

The object of the invention is to provide a convenient and efficient method, whereby the outside of the pipe is conveniently covered or coated with a water-proofing composition such as bitumen, asphaltum, or compositions which are applied hot and which cool and form a complete coating or covering for pipe that will protect the same from injurious contact with the ground.

In laying pipe lines, and particularly those underground, it is a slow, laborious, more or less unsatisfactory method such as heretofore employed in coating these pipes. They are coated unevenly and the work is laborious and not by any means satisfactory.

It is therefore the broad object of our improved method to greatly improve the operation and the results accomplished and save time and labor.

With these and other objects in view, the invention consists in certain novel features of construction and combinations and arrangements of parts, which will be more fully hereinafter described and pointed out in the claims.

In the accompanying drawings—

Figure 1 is a broken view in side elevation, illustrating our improved apparatus;

Figure 2 is a view, taken in section on the line 2—2 of Figure 1, showing the apparatus in operation and the carrying out of our improved method.

We shall first describe the apparatus illustrated and then the method.

1, 1 represent base irons, which may be channels, as shown, and on which angle bars 2, 2 are rigidly secured. These angle bars 2, 2 receive bolts 3 secured by nuts 4, and on these bolts between the pairs of angle bars 2, 2 rollers 5, 5 are mounted to turn.

These rollers are preferably arranged in pairs, and the pairs are spaced apart the desired distance, and said rollers preferably have flanges 6 at their outer ends so that when a pipe 7 is positioned on the four rollers, as clearly indicated in Figure 1, the flanges 6 will prevent longitudinal movement of the pipe.

One pair of bars 1, 1 support parallel upright frames 8, 8 having a bearing sleeve 9 at their upper ends and supporting a shaft 10 having a crank arm 11 at its outer end.

A sprocket wheel 12 is provided on the inner end of shaft 10 and a sprocket chain 13 is passed around the sprocket wheel 12 and around sprocket wheels 14 fixed to turn with two of the rollers at one end of the apparatus, as clearly indicated in the drawings.

With the parts as illustrated and assuming that a pipe 7 is positioned on the rollers 8, our improved method is carried out as follows, reference being made to Figure 2 of the drawing:

One workman pours from a can or other receptacle 15 a coating material 16 onto the upper portion of the pipe 7 as the latter is turned by the crank arm 11. Another workman holds a sheet or pad of asbestos or other analogous material against the coated pipe so as to prevent an excessive flow of the coating material and to insure the event distribution of the same over the surface of the pipe. The workmen move longitudinally of the pipe throughout the coating operation so that when one portion of the pipe is completely coated they move longitudinally of the pipe to allow another application of the material throughout the circumference or exterior of the pipe and thus apply the material in a more or less spiral form.

While we refer to the pouring apparatus as a con or receptacle it is obvious that it may take any other form which will allow the material to flow while hot on to the pipe, and we may use any suitable means for insuring a proper spreading of the material and the escape of excessive material but we believe that a preferable application is such as above described, utilizing two workmen, one applying the liquid and the other causing it to spread evenly as the pipe is revolved.

It is this broad idea of our invention of rotating or revolving a pipe and at the same time applying a coating material thereto which is uniformly spread over the surface of the pipe which constitutes the broad idea of our invention, and while we have illustrated a particular apparatus which is especially designed for this purpose it is obvious that various changes and alterations might be made in the general form of the parts described without departing from our invention and hence we do not limit ourselves to the precise details set forth but consider ourselves at liberty to make such changes and alterations as fairly fall within the spirit and scope of the appended claims.

We claim:

1. The herein described method of applying coating material to a pipe, including first revolving the pipe, applying the coating material while hot on the top of the pipe, and applying a pad of non-conducting material in flat contact with the coating material to uniformly spread the coating and to prevent overflow of excess coating.

2. The herein described method of applying coating material to a pipe, including first revolving the pipe, applying the coating material while hot on the top of the pipe, applying a flexible pad of non-conducting material in flat contact with the coating material to uniformly spread the coating and to prevent overflow of excess coating, moving the pouring and spreading means longitudinally of the pipe at each successive revolution of the pipe whereby the coating is applied in a general spiral form around the pipe.

HUGH M. COOK.
LORLYS R. ROGERS.